US012606418B2

(12) United States Patent
Haikonen et al.

(10) Patent No.: US 12,606,418 B2
(45) Date of Patent: Apr. 21, 2026

(54) ARRANGEMENT, ELEVATOR AND METHOD

(71) Applicant: Kone Corporation, Helsinki (FI)

(72) Inventors: Aki Haikonen, Helsinki (FI); Tapio Siironen, Helsinki (FI); Seppo Valliovuo, Helsinki (FI); Ville Myyrylainen, Helsinki (FI); Lasse Nyman, Helsinki (FI)

(73) Assignee: Kone Corporation, Helsinki (FI)

( * ) Notice: Subject to any disclaimer, the term of this patent is extended or adjusted under 35 U.S.C. 154(b) by 1329 days.

(21) Appl. No.: 17/351,485

(22) Filed: Jun. 18, 2021

(65) Prior Publication Data

US 2022/0017333 A1 Jan. 20, 2022

(30) Foreign Application Priority Data

Jul. 17, 2020 (EP) .................................... 20186411

(51) Int. Cl.
*B66B 13/16* (2006.01)
*B66B 5/00* (2006.01)

(52) U.S. Cl.
CPC .......... *B66B 13/165* (2013.01); *B66B 5/0087* (2013.01)

(58) Field of Classification Search
CPC ... B66B 13/165; B66B 5/0087; B66B 5/0056; B66B 13/146; B66B 5/005; B66B 11/00; B66B 11/0226; B66B 17/34
See application file for complete search history.

(56) References Cited

U.S. PATENT DOCUMENTS 4,009,767 A * 3/1977 Stadigh ................. B66B 13/185 187/331
5,454,447 A * 10/1995 Kulak ................... B66B 13/185 187/331

FOREIGN PATENT DOCUMENTS

| | | | | | |
|---|---|---|---|---|---|
| CN | 203461671 | U | | 3/2014 | |
| CN | 108883906 | A | | 11/2018 | |
| EP | 3003944 | A1 | | 4/2016 | |
| EP | 3342743 | A1 | * | 7/2018 | B66B 13/06 |
| EP | 3636577 | A1 | * | 4/2020 | B66B 13/12 |
| EP | 3939927 | A1 | * | 1/2022 | B66B 11/00 |
| GB | 1498039 | A | | 1/1978 | |
| WO | WO-2017212106 | A1 | * | 12/2017 | B66B 5/0087 |

OTHER PUBLICATIONS

Extended European Search Report for European Patent Application No. 20186411.3 dated Jan. 22, 2021.
Chinese Office Action and Search Report dated Mar. 28, 2025 for corresponding Chinese Application No. 202110755925.7.

* cited by examiner

*Primary Examiner* — Jeffrey Donels
(74) *Attorney, Agent, or Firm* — Harness, Dickey & Pierce, P.L.C.

(57) ABSTRACT

An arrangement for controlling a lock of an upmost landing door of an elevator, an elevator and a method. The arrangement comprises an actuator arranged to be activated in consequence of activation of a service limit device of the elevator, the actuator being connected to the lock of the upmost landing door, and said activation of the actuator arranged to open said lock.

17 Claims, 5 Drawing Sheets

ARRANGEMENT, ELEVATOR AND METHOD

CROSS-REFERENCE TO RELATED APPLICATIONS

This application claims priority to European Patent Application No. 20186411.3 filed on Jul. 17, 2020, the entire contents of which are incorporated herein by reference.

BACKGROUND

The invention relates to an arrangement for controlling a lock of an upmost landing door of an elevator.

The invention further relates to an elevator comprising an elevator shaft and an elevator car arranged in the elevator shaft.

The invention still further relates to a method for controlling a lock of an upmost landing door of an elevator.

Elevators where a headroom is low, such as NHR (No Head Room) elevators are increasingly popular. The headroom in this context means the clearance between the roof of the elevator car and the ceiling of the elevator shaft in the situation when the elevator car is at its uppermost position. In an advantageous solution the headroom can be so low that the height of the elevator shaft is equal to the height of the floors of the building. In that case the elevator shaft can be totally inside the building.

The elevators having a low headroom require a means for preventing the elevator car movement upwards so that a certain safe working space between the roof of the elevator car and the ceiling of the elevator shaft is provided for an inspection and maintenance person when he/she is accessing to the machines and shaft components above the elevator car. Said means are sometimes called as a service limit device. Typically, the service limit device stops the elevator car at a level that is of the order of 50 cm below the level of the upmost landing door of the elevator. A problem is that if the elevator car is stopped by the service limit device, the upmost landing door does not open or cannot be opened. This may interfere work of the inspection and maintenance personnel. Additionally, if for some reason, the service limit device stops an elevator car having passengers therein, the passengers cannot be evacuated through the upmost landing door.

SUMMARY

Viewed from a first aspect, there can be provided an arrangement for controlling a lock of an upmost landing door of an elevator, the arrangement comprising an actuator arranged to be activated in consequence of activation of a service limit device of the elevator, the actuator being connected to the lock of the upmost landing door, and said activation of the actuator arranged to open said lock.

Thereby an arrangement simplifying inspection and maintenance work of the elevator and/or evacuating of the elevator car may be achieved.

Viewed from a further aspect, there can be provided an elevator comprising an elevator shaft, an elevator car arranged in the elevator shaft, and the arrangement described above.

Thereby an elevator where inspection and maintenance work of the elevator is easy and/or evacuating of the elevator car is simple may be achieved.

Viewed from a still further aspect, there can be provided a method for controlling a lock of an upmost landing door of an elevator, the method comprising:

activating an actuator in consequence of activation of a service limit device of the elevator, and causing the lock of the upmost landing door to open by said activation of the actuator.

Thereby a method easing inspection and maintenance work of the elevator and/or evacuating of the elevator car may be achieved.

The arrangement, the elevator and the method are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit subtasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

In one embodiment, the arrangement comprises a mechanical connection element connecting said actuator to the lock of the upmost landing door. An advantage is that a simple way to provide the connection form the actuator to the lock may be achieved.

In one embodiment, the mechanical connection element comprises a cable. An advantage is that the cable has a flexibility that simplifies the routing of the mechanical connection element.

In one embodiment, the actuator is arranged to a reaction plate arranged in an elevator shaft of the elevator, the reaction plate being arranged to receive a contacting element from the service limit device of an elevator car arranged in said elevator shaft, the received contacting element being arranged to activate the actuator. This combination of the reaction plate and the service limit device is provided for stopping movement of the elevator car upwards so that the safety of people in the elevator car is ensured. For instance, during inspection or maintenance of an elevator having a low headroom or no head room at all, the reaction plate and the service limit device guarantee that the elevator car stops its movement upwards so that it is left such a sufficient room between the elevator car and a ceiling of the elevator shaft that maintenance personnel may work safe also above the elevator car.

On the other hand, if a certain malfunction takes place during a normal operation of the elevator, due to which malfunction the reaction plate receives the contacting element from the service limit device leading to stopping the elevator car close to the upmost landing door. Then the actuator opens the lock of the upmost landing door, which makes it possible to evacuate people from the elevator car via the upmost landing door.

An advantage of this embodiment is thus that the safety of people in the elevator car may be ensured.

In one embodiment, the reaction plate comprises at least one opening arranged to receive the contacting element. An advantage is that the structure is simple and reliable.

In one embodiment, the reaction plate is attached to the elevator shaft movably in direction of the shaft, so that the reaction plate is able to move with the received contacting element upwards, and said movement of the reaction plate is arranged to be transmitted by the mechanical connection element to the lock for opening thereof. An advantage is that very simple and immediate activation of the lock may be achieved.

In one embodiment, the actuator is connected to the lock of the upmost landing door electrically and said activation of the actuator is arranged to be transmitted electrically to an electrically operating opening arrangement of the lock for opening said lock. An advantage is that the arrangement is almost maintenance-free. Another advantage is that additional functions may be linked to the activation, e.g. an alarm signal, in a simple way.

In one embodiment, the arrangement comprises a wire from the actuator to the electrically operating opening arrangement of the lock. An advantage is that the wire is a simple means for transmitting electrical power or signal.

In one embodiment, the actuator is provided with a wireless transmitter for creating an electrical signal as a response to the activation of the actuator, and wherein the electrically operating opening arrangement is provided with a wireless receiver for receiving said electrical signal, said electrically operating opening arrangement arranged for opening the lock as a consequence of receiving said electrical signal. An advantage is that there is no need for a physical connection between the actuator and the electrically operating opening arrangement, and thus the arrangement may be realized very freely.

In one embodiment, the activation of the actuator is arranged to be transmitted as an electrical data signal. An advantage is that the arrangement may be connected or linked to an electrically functioning control system of the elevator.

In one embodiment, the actuator is connected to the lock of the upmost landing door by an optical fibre and said activation of the actuator is arranged to be transmitted optically to an electrically operating opening arrangement of the lock for opening said lock. An advantage is that the arrangement may be connected or linked to an optically functioning control system of the elevator.

In one embodiment, the elevator has an operation mode and an inspection or maintenance mode, and the actuator is able to be activated in the inspection or maintenance mode. An advantage is that the safety of inspection or maintenance personnel may be improved.

In one embodiment, the elevator is a No Head Room (NHR) elevator. An advantage is that safety of the NHR elevators may be enhanced.

In one embodiment, the method comprises transmitting the activation of the actuator by a mechanical connection element from the actuator to the lock of the upmost landing door. An advantage is that a simple method to provide the connection form the actuator to the lock may be achieved.

In one embodiment, the method comprises transmitting the activation of the actuator electrically. An advantage is that the arrangement is almost maintenance-free.

BRIEF DESCRIPTION OF THE DRAWINGS

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1:
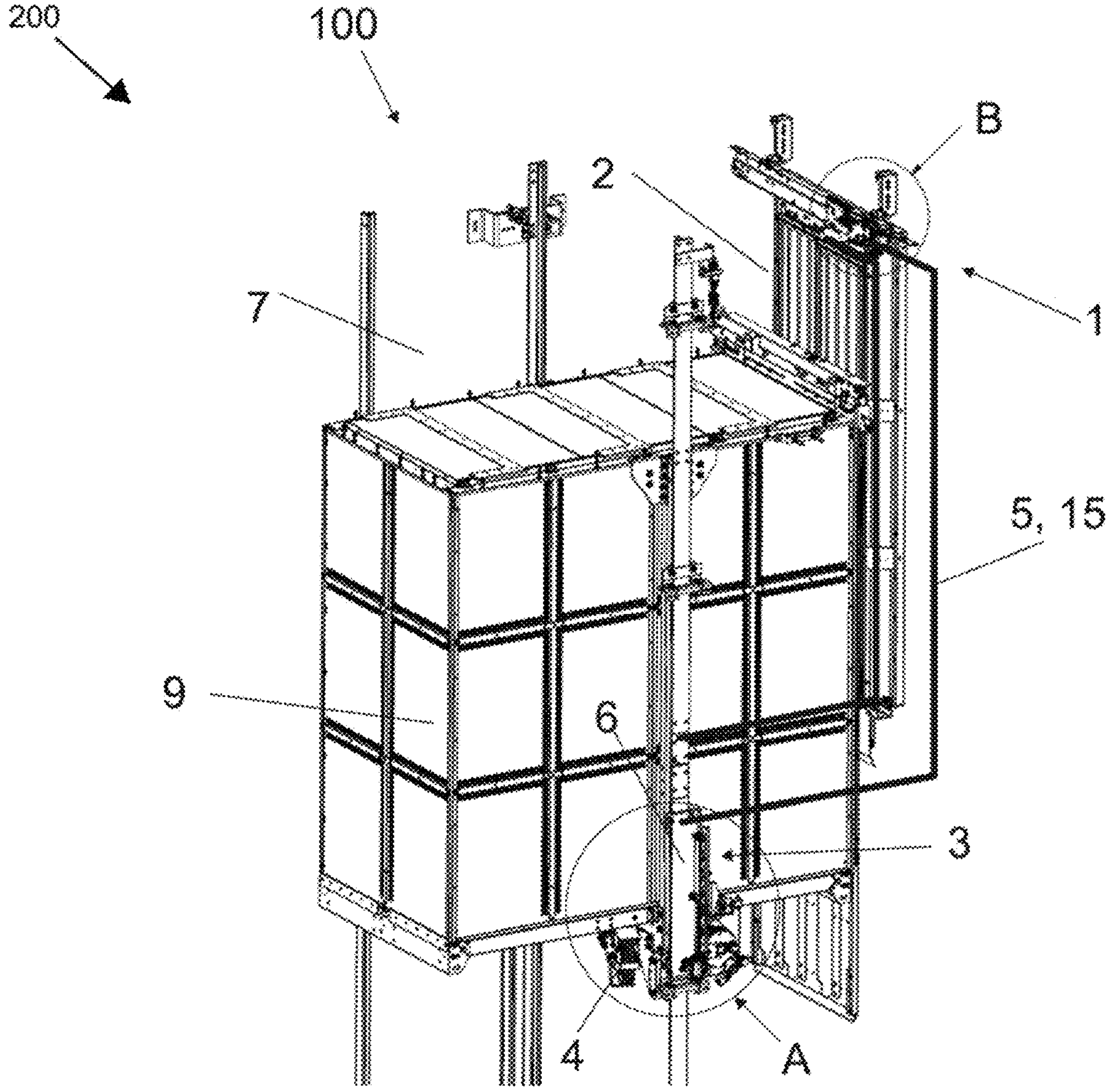
FIG. 1 is a schematic perspective view of an arrangement and method in partial cross-section.
Figure 2:
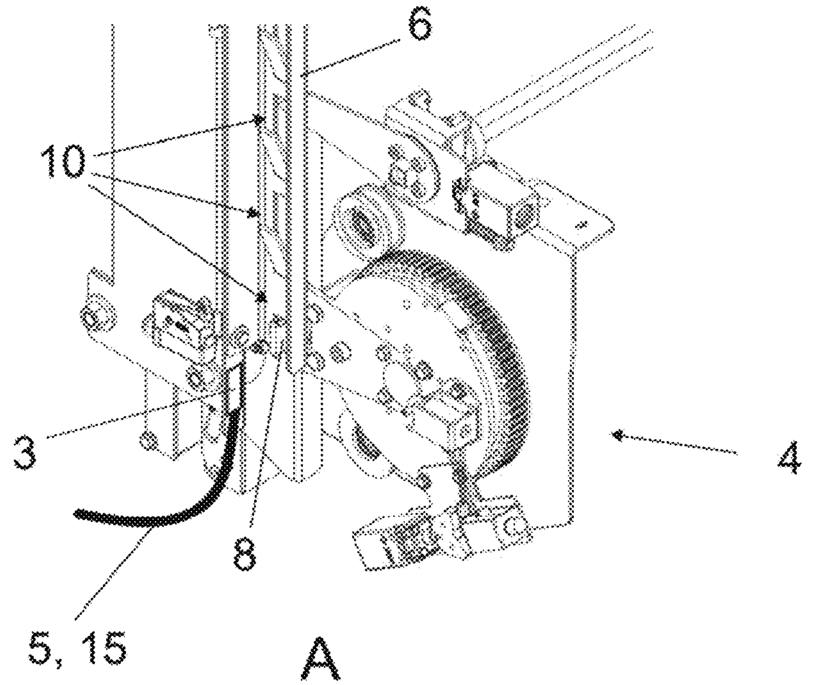
FIG. 2 is a schematic perspective view of a detail of the arrangement and method shown in FIG. 1.
Figure 3:
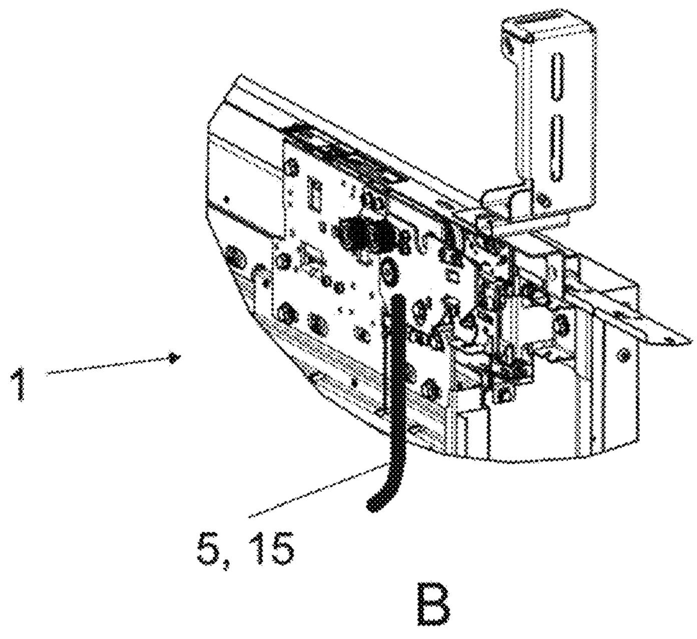
FIG. 3 is a schematic perspective view of another detail of the arrangement and method shown in FIG. 1.

FIG. 1 is a schematic perspective view of an elevator in partial cross-section, FIG. 2 is a schematic perspective view of a detail of an arrangement and method for an elevator, and FIG. 3 is a schematic perspective view of another detail of the arrangement and method shown in FIG. 1. The elevator 200 may have a low headroom, but not necessary.

The elevator 200 comprises an elevator car 9 that defines an interior space for accommodating passengers. The elevator car 9 is arranged in an elevator shaft 7. In one embodiment, the elevator is a No Head Room (NHR) elevator.

The elevator is provided with an arrangement 100 for controlling a lock 1 of an upmost landing door 2. The arrangement 100 comprises an actuator 3 that is activated in consequence of activation of a service limit device 4 of the elevator. The actuator 3 is connected to the lock 1 of the upmost landing door. Following the activation of the actuator 3, the lock 1 is arranged to open. When the lock is opened it is possible to open the upmost landing door 2, both from the interior space and outside of the elevator car 9.

In one embodiment, the arrangement 100 comprises a mechanical connection element 5 that connects the actuator 3 to the lock 1 of the upmost landing door. In one embodiment, such as shown in FIGS. 1 and 2, the mechanical connection element 5 comprises a cable.

In other embodiments, the mechanical connection element 5 comprises a rope, a chain, and/or a belt.

In one embodiment, such as shown in FIGS. 1 and 2, the mechanical connection element 5, such as the cable, or at least a part thereof, is arranged in a housing 15. The housing may be e.g. a simple tube having mono- or multilayered structure.

In one embodiment, the mechanical connection element 5 is guided by at least one pulley or another type of mechanical guide.

In one embodiment, the actuator 3 is arranged to a reaction plate 6 that is arranged in an elevator shaft 7 of the elevator. In one embodiment, the reaction plate 6 (or service limit device reaction plate) is linked up with a service limit device 4 (such as one shown in FIG. 2) that is a device arranged for preventing the elevator car 9 moving too high in the elevator shaft 7. Typically, the service limit device 4 is activated in the inspection or maintenance mode of the elevator. The reaction plate 6 comprises a receiving means that is adapted to receive a contacting element 8 from the activated service limit device 4 of the elevator car 9. In one embodiment, the contacting element 8 is a trigger of a pre-triggering device. As said receiving means has received the contacting element 8, the actuator 3 is activated.

In one embodiment, the receiving means arranged in the reaction plate 6 comprises at least one opening(s) 10 arranged to receive the contacting element 8. In one embodiment, there are two or more, such as six or eight, openings 10 arranged successively in the moving direction of the elevator car 9. The idea of the plurality of openings 10 is that the length of the reaction plate 6 may be extended and thus it is ensured that the contacting element 8 (in a moving elevator car) hits in one of the openings 10.

In one embodiment, the reaction plate 6 is attached movably to the elevator shaft 7 such that the reaction plate 6 may move in direction of the shaft 7. Thus, the reaction plate 6 can move with the received contacting element 8 (and the elevator car 9) upwards. In one embodiment, said movement of the reaction plate 6 is arranged to be transmitted to the lock 1 for opening thereof. For instance, the movement may cause the mechanical connection element 5 (such as a cable) to pull the lock 1 open.

In one embodiment, the reaction plate 6 attached movably to the elevator shaft 7 is arranged to activate a gripping device that stops movement of the elevator car.

Figure 4:
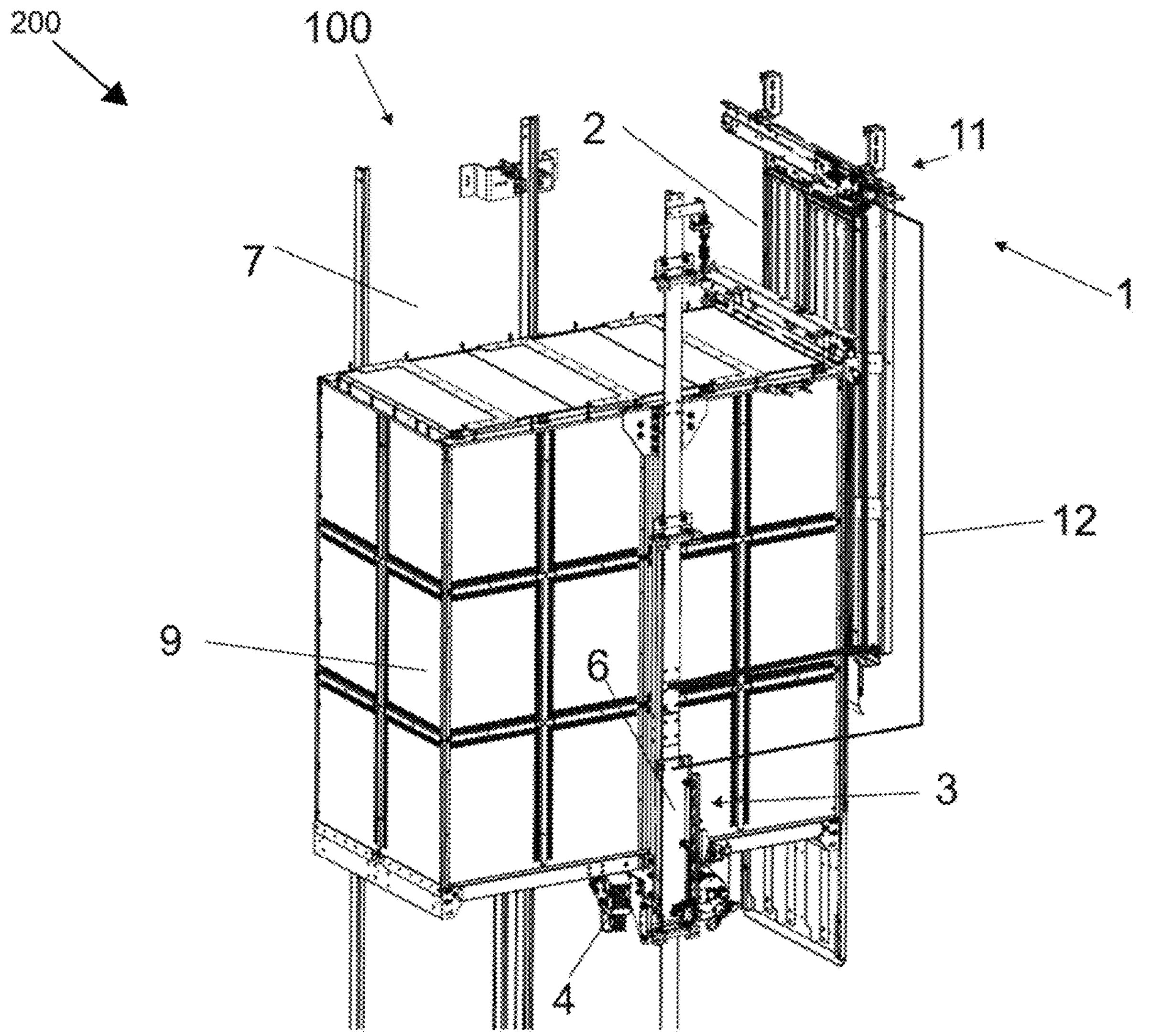
FIG. 4 is a schematic perspective view of another arrangement and method in partial cross-section.

FIG. 4 is a schematic perspective view of another arrangement and method in partial cross-section.

In one embodiment, the actuator 3 is connected to the lock of the upmost landing door 2 electrically, and the lock 1 is provided with an electrically operating opening arrangement 11. In this embodiment, the activation of the actuator 3 is arranged to be transmitted electrically in the lock 1 for opening thereof.

In one embodiment, such as shown in FIG. 4, the electrical connection between the actuator 3 and the electrically operating opening arrangement 11 is settled by a wire 12. In one embodiment, the electrical activation may be based on electrical power (current or voltage) delivered through the wire 12 to the opening arrangement 11. In another embodiment, the activation of the actuator 3 is transmitted as an electrical data signal that induces the opening arrangement 11 for opening the lock 1.

Figure 5:
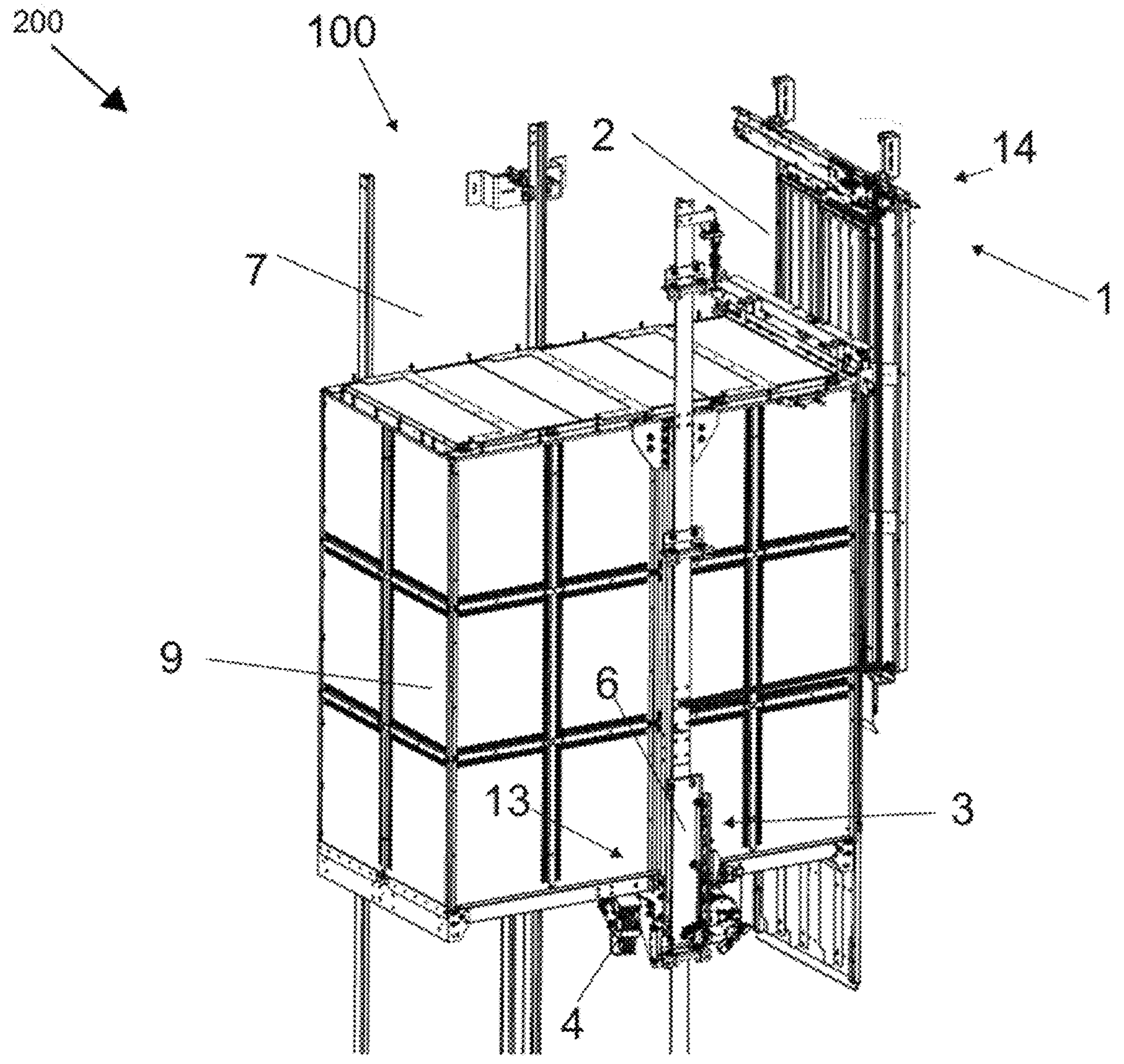
FIG. 5 is a schematic perspective view of a third arrangement and method in partial cross-section.

FIG. 5 is a schematic perspective view of a third arrangement and method in partial cross-section.

In one embodiment, the actuator 3 is provided with a wireless transmitter 13 that creates an electrical signal as a response to the activation of the actuator 3, and the electrically operating opening arrangement 11 is provided with a wireless receiver 14 that is arranged to receive said electrical signal. The electrically operating opening arrangement 11 opens the lock 1 when receiving the electrical signal.

In one embodiment, the actuator 3 is connected to the lock of the upmost landing door 2 by an optical fibre (not shown). The activation of the actuator 3 is arranged to be transmitted optically to an electrically operating opening arrangement 11 of the lock for opening said lock.

In one embodiment, the elevator 200 has plurality of modes, such as an operation mode and an inspection or maintenance mode. In the operation mode the elevator 200 is functioning in its intended use for moving people or freight between floors, levels or decks of a building or other structure. In the inspection or maintenance mode, the elevator 200 is not moving people or freight but it is made tests, inspections, adjustment works, maintenance or repairs, etc. in the elevator. In the inspection or maintenance mode, one or more maintenance person(s) may be in the elevator car. Typically, properties of the elevator depend on the current mode; for instance, the speed of the elevator car may be lower in the inspection or maintenance mode than in the operation mode.

In an embodiment, the actuator 3 is able to be activated in the inspection or maintenance mode only. In other words, the actuator 3 cannot be activated in the operation mode. However, in another embodiment, the the actuator 3 can be activated also in the operation mode.

Figure 6:
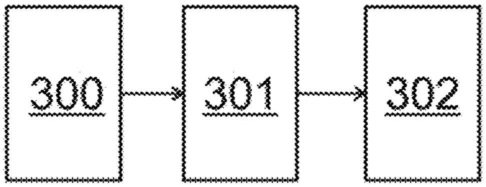
FIG. 6 illustrates a method for controlling a lock of an upmost landing door of an elevator.

FIG. 6 illustrates a method for controlling a lock of an upmost landing door of an elevator.

According to an aspect, the method for controlling the lock 1 of the upmost landing door 2 of an elevator comprises activating 300 an actuator 3 in consequence of activation of a service limit device 4 of the elevator. The activating 302 then causes the lock 1 of the upmost landing door 2 to open 301 by said activation of the actuator 3.

In one embodiment of the method, the method comprises transmitting 301 the activation of the actuator by a mechanical connection element 5 from the actuator 3 to the lock 1 of the upmost landing door 2. In another embodiment of the method, the method comprises transmitting 301 the activation of the actuator 3 electrically. This electrical activation may be based on e.g. electrical power (current or voltage) delivered from the actuator to the opening arrangement 11, or on an electrical data signal.

In still another embodiment of the method, the method comprises transmitting 301 an optical data signal from the actuator 3 optically.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims.

REFERENCE SYMBOLS

1 lock
2 upmost landing door
3 actuator
4 service limit device
5 mechanical connection element
6 reaction plate
7 elevator shaft
8 contacting element
9 elevator car
10 opening
11 electrically operating opening arrangement
12 wire
13 wireless transmitter
14 wireless receiver
100 arrangement
200 elevator

The invention claimed is:

1. An arrangement for controlling a lock of an upmost landing door of an elevator, the arrangement comprising:
- an actuator configured to be activated in response to a service limit device of the elevator stopping upwards movement of an elevator car in an elevator shaft of the elevator,
- wherein the actuator is connected to the lock of the upmost landing door, and
- wherein the arrangement is configured to cause the lock of the upmost landing door to open in response to the activation of the actuator.

2. The arrangement as claimed in claim 1, further comprising:
- a mechanical connection element connecting the actuator to the lock of the upmost landing door.

3. The arrangement as claimed in claim 2, wherein the mechanical connection element comprises a cable.

4. The arrangement as claimed in claim 1, wherein
the actuator is coupled to a reaction plate that is located in the elevator shaft of the elevator,
the reaction plate is configured to receive a contacting element from the service limit device of the elevator car that is located in the elevator shaft, and
the received contacting element is configured to activate the actuator based on being received by the reaction plate.

5. The arrangement as claimed in claim 4, wherein the reaction plate comprises at least one opening that is configured to receive the contacting element.

6. The arrangement as claimed in claim 4, wherein
the reaction plate is attached to the elevator shaft movably in a direction of the elevator shaft, such that the reaction plate is configured to move with the received contacting element upwards, and
the arrangement is configured to cause movement of the reaction plate to be transmitted to the lock of the upmost landing door to cause the lock of the upmost landing door to open.

7. The arrangement as claimed in claim 1, wherein
the actuator is connected to the lock of the upmost landing door electrically,
such that the arrangement is configured to cause the activation of the actuator to be transmitted electrically to an electrically operating opening arrangement of the lock of the upmost landing door to cause the lock of the upmost landing door to open.

8. The arrangement as claimed in claim 7, further comprising:
a wire extending from the actuator to the electrically operating opening arrangement of the lock such that the wire is configured to cause the actuator to be electrically connected to the electrically operating opening arrangement.

9. The arrangement as claimed in claim 7, wherein
the actuator includes a wireless transmitter that is configured to create an electrical signal in response to the activation of the actuator,
the electrically operating opening arrangement includes a wireless receiver that is configured to receive the electrical signal, and
the electrically operating opening arrangement is configured to cause the lock of the upmost landing door to open based on receiving said electrical signal.

10. The arrangement as claimed in claim 7, wherein the arrangement is configured to cause the activation of the actuator to be transmitted electrically to the electrically operating opening arrangement as an electrical data signal that causes the electrically operating opening arrangement to cause the lock of the upmost landing door to open.

11. The arrangement as claimed in claim 1, wherein
the actuator is connected to the lock of the upmost landing door by an optical fibre, and
the arrangement is configured to cause the activation of the actuator to be transmitted optically to an electrically operating opening arrangement of the lock of the upmost landing door to cause the lock of the upmost landing door to open.

12. The arrangement as claimed in claim 1, wherein
the elevator is configured to operate in an operation mode and is further configured to operate in an inspection or maintenance mode, and
the actuator is configured to be activated based on the elevator operating in the inspection or maintenance mode only, such that the actuator is configured to not be activated based on the elevator operating in the operation mode.

13. An elevator, comprising:
an elevator shaft,
an elevator car located in the elevator shaft, and
the arrangement claimed in claim 1.

14. The elevator as claimed in claim 13, wherein the elevator is a No Head Room (NHR) elevator.

15. A method for controlling a lock of an upmost landing door of an elevator, the method comprising:
activating an actuator in response to a service limit device of the elevator stopping upwards movement of an elevator car in an elevator shaft of the elevator, and
causing the lock of the upmost landing door to open in response to the activation of the actuator.

16. The method as claimed in claim 15, further comprising:
transmitting the activation of the actuator by a mechanical connection element from the actuator to the lock of the upmost landing door.

17. The method as claimed in claim 15, further comprising:
transmitting the activation of the actuator electrically.

* * * * *